V. McINTYRE & F. DONOHUE.
BOLT AND NUT.
APPLICATION FILED MAR. 30, 1910.
985,269.
Patented Feb. 28, 1911.
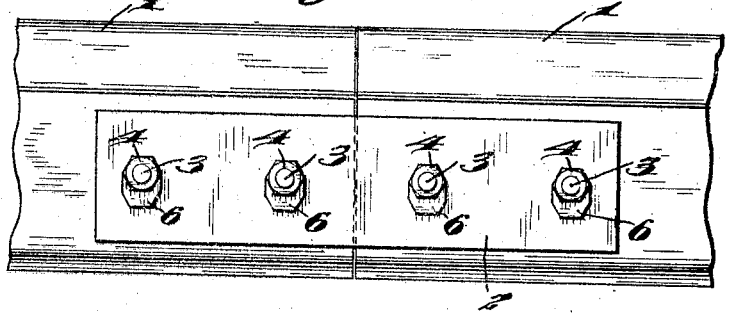
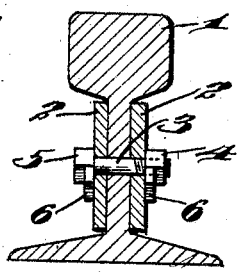
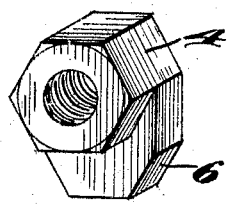
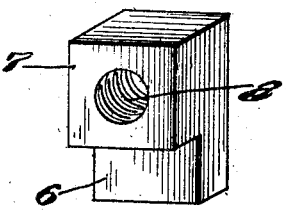
Witnesses
Inventors
Vincent McIntyre
Francis Donohue,
By Joshua R. H. Potts
Attorney

UNITED STATES PATENT OFFICE.

VINCENT McINTYRE AND FRANCIS DONOHUE, OF PHILADELPHIA, PENNSYLVANIA.

BOLT AND NUT.

985,269.    Specification of Letters Patent.    Patented Feb. 28, 1911.

Application filed March 30, 1910. Serial No. 552,433.

*To all whom it may concern:*

Be it known that we, VINCENT MCINTYRE and FRANCIS DONOHUE, citizens of the United States, residing at Philadelphia, county of Philadelphia, and State of Pennsylvania, have invented certain new and useful Improvements in Bolts and Nuts, of which the following is a specification.

Our invention relates to improvements in bolts and nuts, the object of the invention being to provide a bolt and nut which are so constructed that neither will turn accidentally by reason of vibration, and this is accomplished by a preponderance of weight at one side of the bolt head and at one side of the nut, thereby utilizing the force of gravity to prevent the accidental turning of either.

With this and other objects in view, the invention consists in certain novel features of construction and combinations and arrangements of parts as will be more fully hereinafter described and pointed out in the claim.

In the accompanying drawings: Figure 1, is a view in side elevation illustrating our improvements in connection with a rail joint. Fig. 2, is a view in cross section. Fig. 3, is a detail perspective view of one of the nuts. Fig. 4, is a similar view of a modified form of nut.

1, 1, represent the meeting ends of the rails, 2 the fish plates secured at opposite sides of the rails by our improved bolts 3, and our improved nuts 4. The bolts 3 are provided with heads 5, which are of the same shape as the nuts 4. That is to say, the head of each bolt and each nut is of general hexagonal form provided with depending integral extensions or tongues 6, giving to that side of the nut a preponderance of weight, which is also true of the bolt heads. The purpose of these tongues is that when the nuts and bolts are screwed home, they will be projected downward and by gravity hold the nuts and bolt heads against accidental turning to unscrew.

It is a well known fact, that nuts and bolts on railway rails become loose by reason of the vibration causing the nuts and bolts to turn, and a great many different forms of nut locks have been devised with a view of overcoming this. With our improved nut and bolt, no nut lock is needed, as the preponderance of weight will hold the parts against turning; but by reason of the shape, the ordinary wrench may be employed to turn the nut and bolt. Furthermore, the tongue 6 may be struck a blow to loosen the nut if it should become bound, and has this additional function.

Fig. 4 shows a modified form of nut 7, which is oblong in shape, and is provided with a screw threaded bolt receiving opening 8, at one side of its center, thus the preponderance of weight will be at one side, and with this form of nut, of course, a bolt having a similar head will be employed.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claim.

Having thus described our invention what we claim as new and desire to secure by Letters Patent is:

The combination with a bolt, a head on the bolt having an angular portion concentric with the bolt, and a tongue projecting from said head of the bolt and having its inner face flush with the inner face of the head of the bolt, a nut having a central opening therein, with flattened outer faces all spaced an equal distance from the center of said opening, and a tongue on said nut having its inner face flush with the inner face of the nut, substantially as described.

In testimony whereof we have signed our names to this specification in the presence of two subscribing witnesses.

VINCENT McINTYRE.
FRANCIS DONOHUE.

Witnesses:
R. H. KRENKEL,
C. E. POTTS.